(12) United States Patent
Kaminski et al.

(10) Patent No.: US 7,791,230 B2
(45) Date of Patent: Sep. 7, 2010

(54) HEAT TRANSFER ENHANCEMENT OF DYNAMOELECTRIC MACHINE ROTORS

(75) Inventors: Christopher A. Kaminski, Schenectady, NY (US); Emil D. Jarczynski, Scotia, NY (US); William D. Gerstler, Niskayuna, NY (US); Norman J. Suguitan, Ballston Lake, NY (US); Hendrik P. J. de Bock, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 60 days.

(21) Appl. No.: 12/255,022

(22) Filed: Oct. 21, 2008

(65) Prior Publication Data

US 2010/0096937 A1   Apr. 22, 2010

(51) Int. Cl.
*H02K 9/00* (2006.01)
*H02K 1/32* (2006.01)
*H02K 1/06* (2006.01)

(52) U.S. Cl. .................. 310/55; 310/61; 310/216.069
(58) Field of Classification Search .............. 310/61, 310/55, 216.069
See application file for complete search history.

(56) References Cited

U.S. PATENT DOCUMENTS

| | | | |
|---|---|---|---|
| 2,778,959 A | | 1/1957 | Kilner |
| 3,395,299 A | * | 7/1968 | Quay et al. ............ 310/216.069 |
| 3,995,180 A | * | 11/1976 | Giles ..................... 310/55 |
| 4,543,503 A | | 9/1985 | Kaminski et al. |
| 4,709,177 A | | 11/1987 | Kaminski |
| 5,281,877 A | | 1/1994 | Kazmierczak et al. |
| 5,644,179 A | | 7/1997 | Staub et al. |
| 5,685,063 A | | 11/1997 | Prole et al. |
| 6,204,580 B1 | | 3/2001 | Kazmierczak |

(Continued)

FOREIGN PATENT DOCUMENTS

DE   3700508 A1   7/1988

(Continued)

OTHER PUBLICATIONS

Derwent Translation Abstract and Use/Advantage SU1615842A (1990).*

(Continued)

*Primary Examiner*—Quyen Leung
*Assistant Examiner*—Jose A Gonzalez Quinones
(74) *Attorney, Agent, or Firm*—James W. Pemrick; Ernest G. Cusick; Frank A. Landgraff (57) ABSTRACT

A rotor is provided for a dynamoelectric machine having one or more windings. The windings have one or more turns, and the turns have one or more outlet ducts that are located near a chimney. When the outlet ducts are stacked one on top of another, they form substantially radially oriented passages. The heat transfer performance of a portion of the rotor can be improved by locating two or more circumferentially spaced radial ducts near the chimney. A chimney can also be formed of one or more chimney slots defined in at least a portion of the turns, where one or more chimney slots extend in a substantially slanted direction to a radial direction of the rotor. A transition region of the rotor can also include one or more diagonal flow channels, which discharge into one or more chimneys.

13 Claims, 10 Drawing Sheets

U.S. PATENT DOCUMENTS

| | | |
|---|---|---|
| 6,362,545 B1 | 3/2002 | Prole et al. |
| 6,459,180 B1 | 10/2002 | Mori |
| 6,628,020 B1 | 9/2003 | Tong |

FOREIGN PATENT DOCUMENTS

| | | |
|---|---|---|
| GB | 936617 | 9/1963 |
| JP | 10285853 A | 10/1998 |
| SU | 1615842 A * | 12/1990 |

OTHER PUBLICATIONS

M. K. Chyu, et al., "Concavity Enhanced Heat Transfer In An Internal Cooling Passage", ASME Proceedings of the 1997 International Gas Turbine & Aeroengine Congress & Exhibition, Paper No. 437, p. 1-7, Orlando, FL, Jun. 2-5, 1997.

* cited by examiner

HEAT TRANSFER ENHANCEMENT OF DYNAMOELECTRIC MACHINE ROTORS

BACKGROUND OF THE INVENTION

This application is related to application Ser. No. 12/132,172, to Rebecca A. Nold et al., titled "Heat Transfer Enhancement Of Ventilation Chimneys For Dynamoelectric Machine Rotors", filed on Jun. 3, 2008, and to application Ser. No. 12/178,208, to Emil D. Jarczynski et al., titled "Heat Transfer Enhancement Of Ventilation Chimneys For Dynamoelectric Machine Rotors", filed on Jul. 23, 2008.

The present invention relates to increasing the heat transfer performance of dynamoelectric machine rotors. Specifically, the invention relates to turbulating the surface of a ventilation chimney and improving the configuration of the transition region in a rotor to increase the heat transfer performance and to reduce the temperature of the rotor hot spot.

The rotors in large gas cooled dynamoelectric machines have a rotor body, which is typically made from a machined high-strength solid iron forging. Axially extending radial slots are machined into the outer periphery of the rotor body at specific circumferential locations to accommodate the rotor winding. The rotor winding in this type of machine typically consists of a number of complete coils, each having many field turns of copper conductors. The coils are seated in the radial slots in a concentric pattern with, for example, two such concentric patterns in a two-pole rotor. The coils are supported in the rotor body slots against centrifugal forces by wedges that bear against machined dovetail surfaces in each slot. The regions of the rotor winding coils that extend beyond the ends of the main rotor body are called "end windings" and are supported against centrifugal forces by high strength steel retaining rings. The section of the rotor shaft forging which is disposed underneath the rotor end windings is referred to as the spindle. For ease of reference and explanation hereinbelow, the rotor winding can be characterized as having a central radial flow or diagonal flow region between the end winding discharge chimneys, a rotor end winding region that extends beyond the pole face, radially spaced from the rotor spindle, and a slot end region which contains the radial flow ventilation or discharge chimneys. The slot end region is located between the central radial flow region and the rotor end winding region.

The design of large turbo-electric or dynamoelectric machinery requires high power density in the stator and rotor windings. As ratings increase, both specific loading of the windings (i.e., current carried by a given cross section) and the distance to a heat sink such as a cooler (or heat exchanger) also increase. Additional cooling technology can be employed to carry heat out of the parts of the generator.

Direct cooling of the rotor windings is a well-established practice in electric machinery design. The cooling medium, typically hydrogen gas or air, is introduced directly to the winding in several ways. The gas may enter the rotor through subslots cut axially into the rotor forging and may exhaust through radial ducts in the copper. The pumping action caused by rotation of the rotor and the heating of the gas pulls gas through the subslot and out the radial ducts. Alternatively, gas may be scooped out of the gap at the rotating surface of the rotor and may follow a diagonal or radial-axial path through the copper winding. The gas exhausts once again at the rotor surface without need for a subslot. These two strategies cool the windings in the rotor body.

Rotor end turns may require additional cooling. One established method for this is to place one or more longitudinal grooves in the copper turn. Each longitudinal groove takes in gas from the axially outboard end of the end region and discharges to an outlet at or near the rotor surface that will pull gas through the groove. The outlet can be a radially directed duct at the end of the rotor body, or the grooves can lead to a vent slot in the tooth or pole of the rotor body. In general, the retaining ring that mechanically supports the end turns is not penetrated. The end turn grooving strategy can be used with any type of rotor body cooling, either radial, radial-axial, or gap-pickup. End turn cooling grooves can also exhaust to a radial ventilation or discharge chimney.

To exhaust the end section gases, the discharge or ventilation chimney is located in the outermost axial position of the rotor body, where it receives no additional cooling from the radial or diagonal flow ducts in the center body section. The discharge chimney is typically the hottest section in the rotor, limiting power output since electrical insulation temperature limits should not be exceeded.

Because of the large number of grooves that typically exhaust to the discharge chimney, the chimney flow cross-section is usually larger than a radial duct used to cool the center body section of the rotor, in both the direction of slot width and along the longitudinal direction of the conductors. Since the cooling gas discharging through the chimney has already cooled and removed heat from the end section, the gas entering the chimney is at elevated temperature. The electrical conductor surrounding the chimney generates heat and also needs to be cooled, and this conductor temperature will be high because it is being cooled with gas at elevated temperature. This causes one of the hottest regions of the rotor to be near the location of the discharge chimney, which limits rotor output and electric power performance. At the same time, the large chimney flow area requires removing more electrical conducting area from the winding, causing increased electrical resistance and heating in the same area where the chimney is cooled with gas at elevated temperature. In addition, the discharge chimney will have less heat transfer surface area on its walls compared to the gas flow cross section in a typical radial cooling duct in the body section of the rotor. Furthermore, because of its large size, the discharge chimney is typically machined such as in a milling operation, and this leaves a smooth surface, and the resulting smooth wall further reduces heat transfer performance.

BRIEF DESCRIPTION OF THE INVENTION

According to one aspect of the present invention, a rotor is provided for a dynamoelectric machine having one or more windings. The windings have one or more turns, and the turns have one or more outlet ducts that are located near a chimney. When the outlet ducts are stacked one on top of another, they form substantially radially oriented passages. The heat transfer performance of a portion of the rotor can be improved by locating two or more circumferentially spaced radial ducts near the chimney.

According to another aspect of the present invention, a cooling gas ventilation chimney is provided for an end region of a dynamoelectric machine having a rotor. The rotor has a plurality of radial slots, and a plurality of coils are seated in the radial slots, and the coils form a plurality of radially stacked turns. The ventilation chimney has one or more chimney slots defined in at least a portion of the radially stacked turns, and the chimney slots extend in a substantially slanted direction to a radial direction of the rotor.

According to yet another aspect of the present invention, a dynamoelectric machine is provided having a rotor, and the rotor includes a transition region located between a diagonal flow region and an end region. A plurality of radial slots are provided in the rotor, and a plurality of coils are respectively seated in the radial slots, and the coils form a plurality of radially stacked turns. The transition region includes one or more diagonal flow channels, which discharge into one or more substantially radial chimneys.

DETAILED DESCRIPTION OF THE INVENTION

Figure 1:
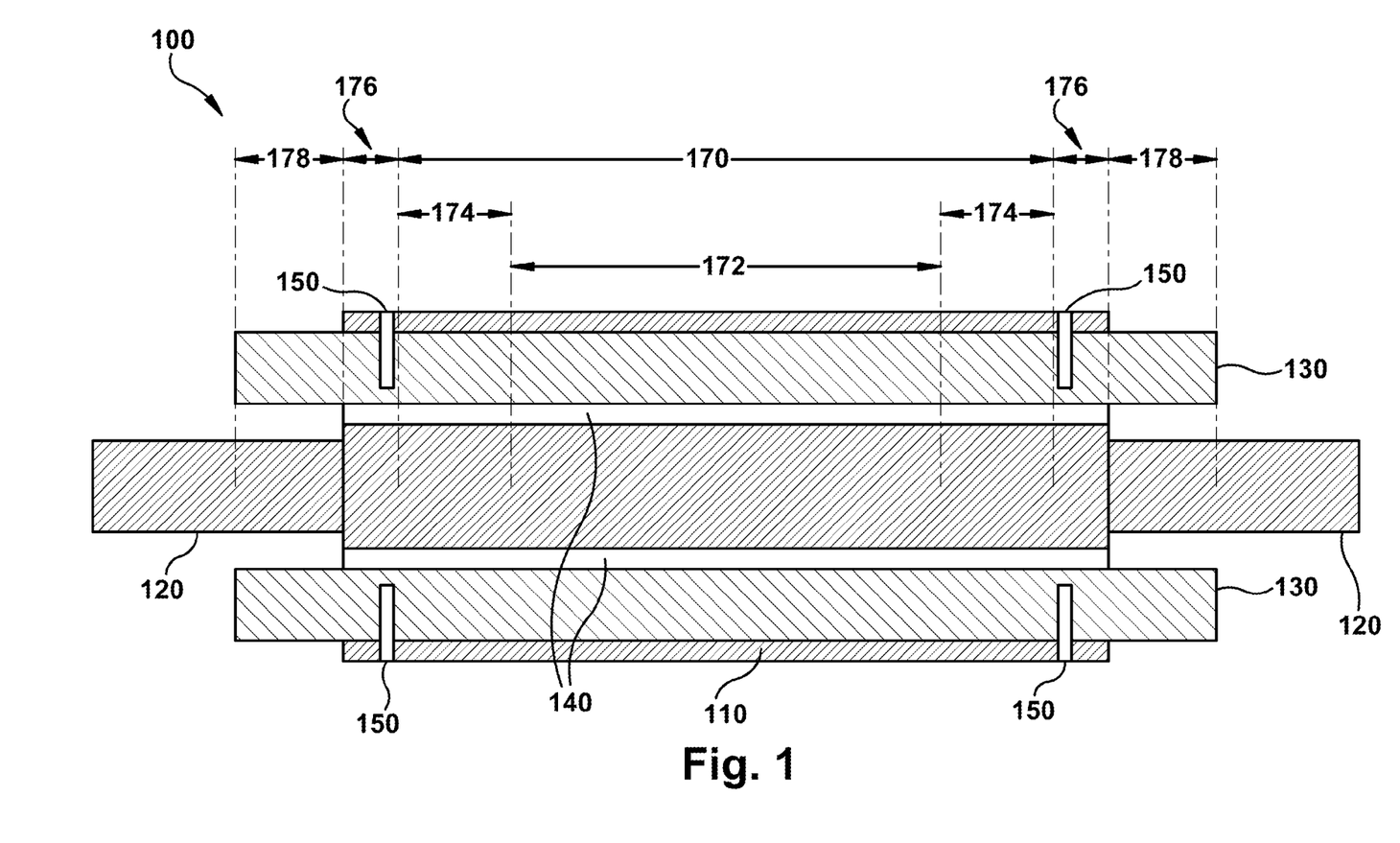
FIG. 1 illustrates a schematic of a rotor of a dynamoelectric machine.

FIG. 1 illustrates a cross-section of a rotor 100 that includes a rotor body 110, rotor spindles 120, winding 130, subslots 140 and ventilation or discharge chimneys 150. Subslot 140 can either be a radial flow subslot 1140 (shown in FIG. 2) or a diagonal flow subslot 2140 (shown in FIGS. 13-19). The radial flow subslot 1140 spans the full length of the rotor body. The diagonal flow subslots extend part way into the body from each end. Rotor 100 is typically made from a machined high-strength solid iron forging. Axially extending radial slots are machined into the outer periphery of the rotor body 110 at specific circumferential locations to accommodate the rotor winding 130. The rotor winding 130 typically comprises a number of complete coils, each having many field turns of copper conductors. The coils are seated in the radial slots in a concentric pattern with, for example, two such concentric patterns in a two-pole rotor. The coils are supported in the rotor body slots against centrifugal forces by wedges that bear against machined dovetail surfaces in each slot. The regions of the rotor winding coils that extend beyond the ends of the main rotor body are called "end windings" and are supported against centrifugal forces by high strength retaining rings. The end winding section is illustrated by region 178.

For ease of reference and explanation herein-below, the rotor winding can be characterized as having a central flow region 172, and a central flow or body cooling region 170. A transition region 174 is located between the central flow region 172 and the slot end region 176. The slot end region 176 contains the discharge chimneys 150, and is located between the body cooling region 170 and the end winding region 178. The end winding region 178 extends beyond the pole face, and is radially spaced from the rotor spindle. In some embodiments, the rotor end region can include the slot end region 176 and/or the end winding region 178. It is to be understood that the present invention is not restricted to diagonal flow rotors, but can also be applied to radial flow rotors, and other rotor body cooling schemes as well.

Figure 2:
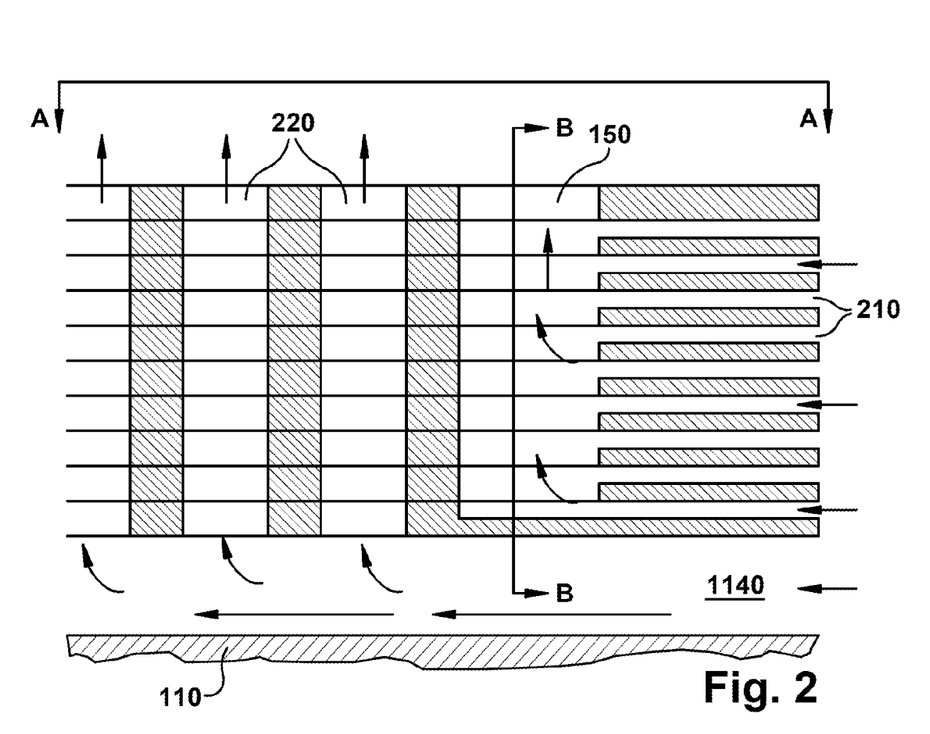
FIG. 2 illustrates a sectional view of a ventilation chimney that is located between the end winding region and the central flow region of the rotor of FIG. 1.

FIG. 2 shows one known system for exhausting end turn cooling grooves in the rotor of a dynamoelectric machine. The end turn cooling grooves 210 enter from the right and exhaust to the chimney 150. Cooling gas flows (as indicated by the arrows in FIG. 2) in a generally horizontal or axial direction in cooling grooves 210, and flows in a generally vertical or radial direction in ventilation chimney 150. The holes in each turn (or conductor layer) that comprise the chimney 150 can be referred to as chimney slots. Accordingly, the chimney 150 is comprised of one or more chimney slots. Additional radially oriented ducts 220 may also be located to vent gas from subslot 140. Rotor end turns may also exhaust to two chimneys, with the upper fraction of the grooves 210 connecting to a first chimney, and the lower grooves connecting to a second chimney. The radial cross-sectional area of chimney 150 is constant in this known system.

Figure 3:
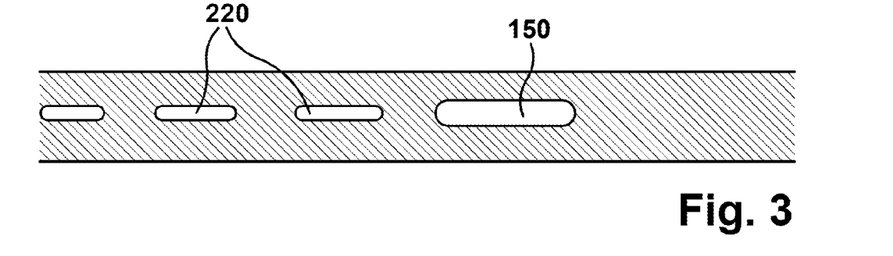
FIG. 3 illustrates a top-down view, as viewed from section line A-A of FIG. 2, and shows the relative size of the ventilation chimney compared to the radial ducts.
Figure 4:
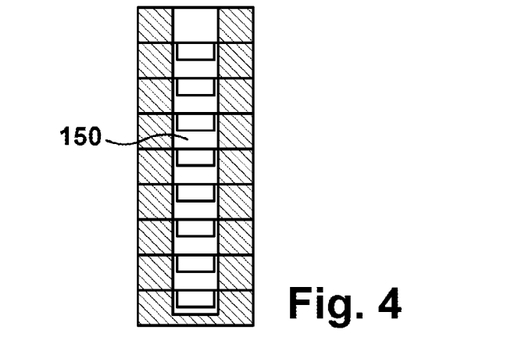
FIG. 4 illustrates a cross section of the termination of the end turn cooling grooves in the ventilation chimney, as seen from section line B-B of FIG. 2

FIG. 3 illustrates a top view as seen from section line A-A of FIG. 2, and shows the relative size of the chimney 150 compared to the radial ducts 220. The radial cross-sectional area of chimney 150 is larger than the cross-sectional area of ducts 220. FIG. 4 illustrates a view toward the end turn grooves as seen looking through section line B-B of FIG. 2, and shows a cross section of the termination of the end turn cooling grooves 210 in chimney 150. It can be seen that the interior walls of chimney 150 are substantially aligned.

Figure 5:
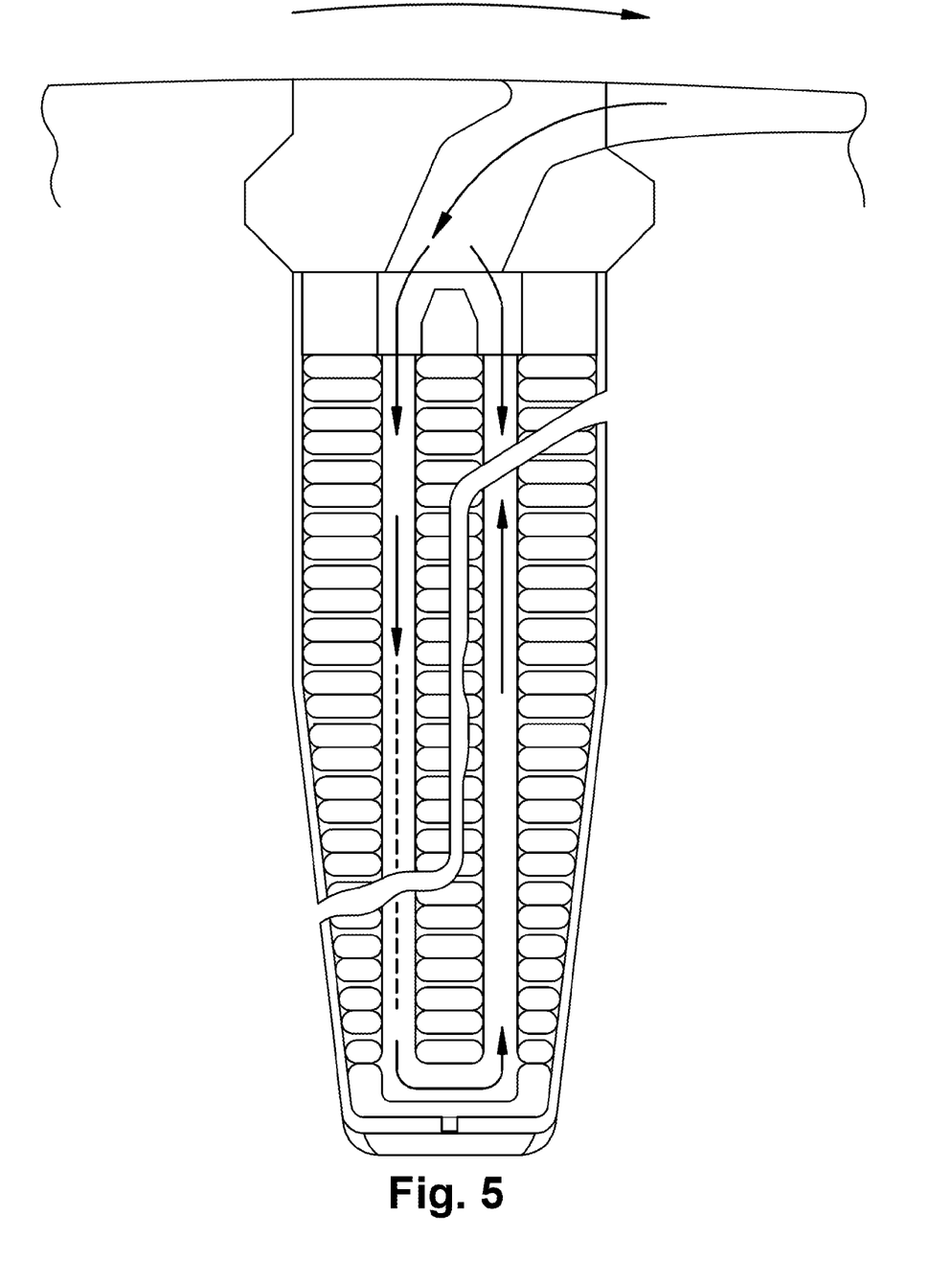
FIG. 5 illustrates a cross-sectional view of slot contents for one known diagonal flow field coil.

FIG. 5 illustrates a detailed cross-sectional view of the slot contents of one known diagonal field coil, which could be used in 2-pole, 4-pole or other generators. Gas flows down through a series of slotted holes, axially offset in each layer from those in the previous layer. The bottom turn can be a channel that redirects the gas to another series of slotted holes that force the gas upward in a diagonal progression to the top of the coil. The pumping action to provide gas flow is obtained in the configuration of slot wedges, requiring little fan pressure to circulate gas through the rotor winding. The holes for gas inlet are inclined in such a manner that rotation of the field forces the gas through the wedge and down into successive turns of the coil. Discharge holes in the wedges have a raised section preceding the hole in the direction of rotation. This creates a pressure reduction at the hole with the lower pressure inducing gas flow by suction from the discharge end.

Figure 6:
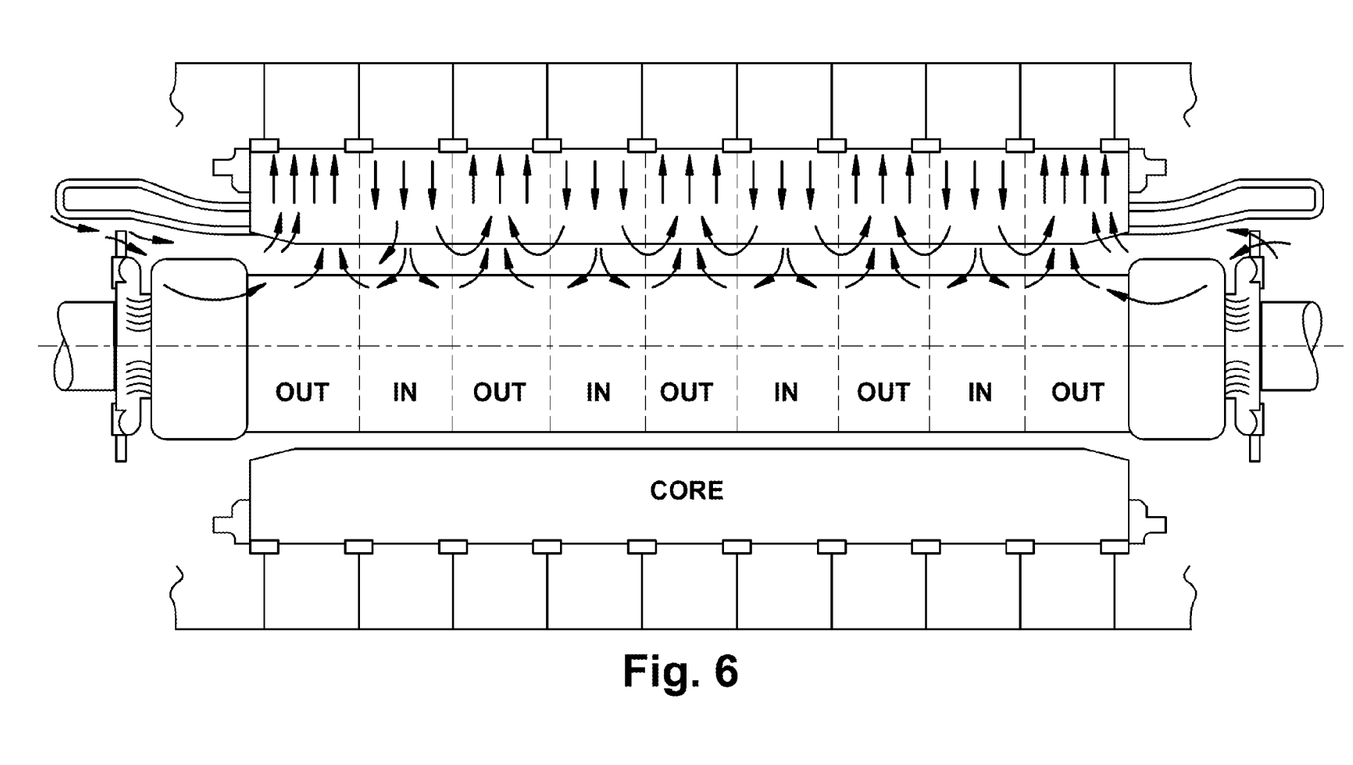
FIG. 6 illustrates a simplified cross-sectional view of one known rotor and stator of a dynamoelectric machine.

FIG. 6 illustrates the several alternating inlet and discharge sections throughout the length of the rotor 100. The sections provide multiple parallel paths through the field winding. The stator core 610 has corresponding inlet and outlet sections matching those in the generator field.

The transition section (region 174 in FIG. 1) of a diagonal flow rotor can be one of the hottest regions in the rotor. The transition section contains a manifold of axial ducts within a quadrilateral area that is bounded by diagonal passages on one end and the slot end discharge chimneys on the other end. It would be beneficial to eliminate the need for a grooved transition section in diagonal flow rotors.

Figure 7:
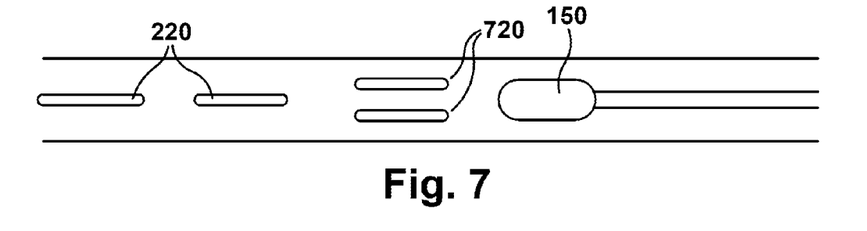
FIG. 7 illustrates a top-down view of a coil showing the use of multiple radial ducts to increase the heat transfer performance, according to one aspect of the present invention.

FIG. 7 illustrates a top down view of a portion of a turn, according to one aspect of the present invention. This embodiment addresses excessive heating around the chimney 150 by adding a separate single or double outlet duct 720 axially adjacent to (or circumferentially spaced from) it, at the first position of the first radial flow duct in the radial flow manifold. The additional outlet duct directs additional cooling gas from the subslot, which is located radially inboard of the field winding.

Figure 8:
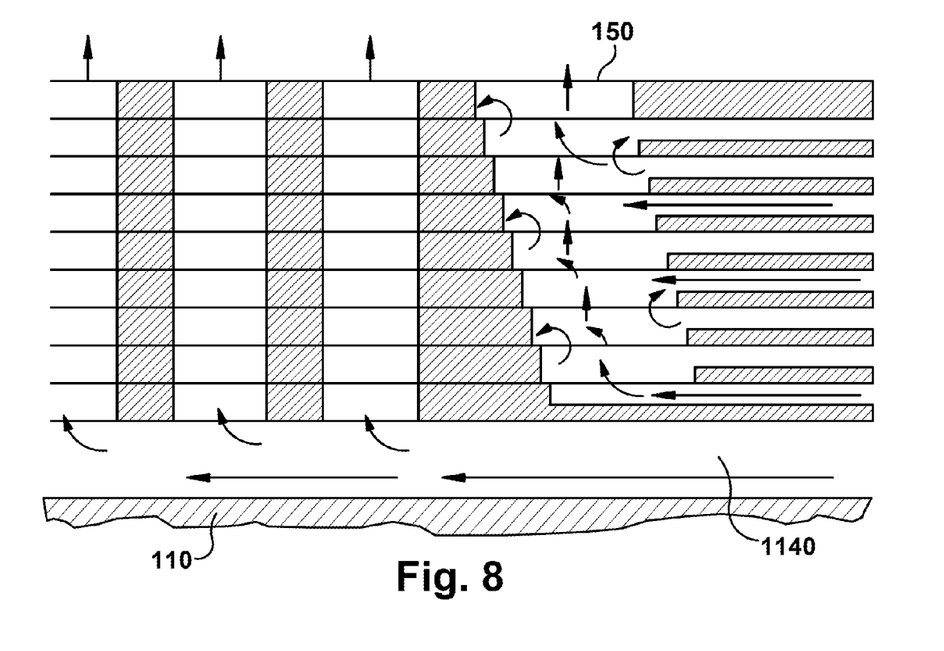
FIG. 8 illustrates a cross-sectional view of a ventilation chimney, according to another aspect of the present invention that has a stepped or tilted flow path configuration.
Figure 9:
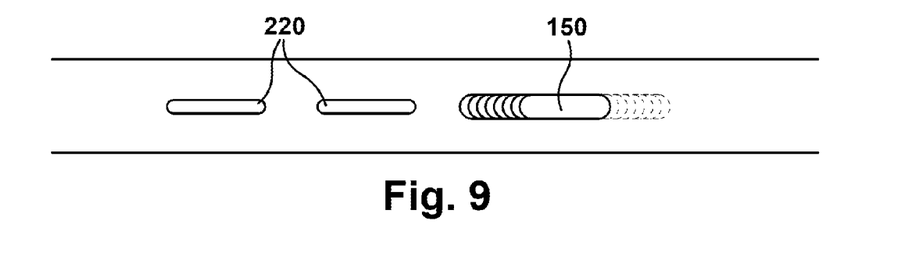
FIG. 9 illustrates a top-down view of the coil shown in FIG. 8.

FIG. 8 illustrates a sectional view of a ventilation chimney 150 that is located between the end winding region (176 and/or 178 in FIG. 1) and the central flow region 172 of the rotor. This embodiment of the present invention can increase the heat transfer of the chimney 150 and involves axial displacement of the individual chimney slots in each turn, that collectively form the chimney 150, to create a staircase which forms a tilted flow path for the gas to follow. The tilted discharge chimney has several benefits. First, the convection cooling through the walls of the chimney is distributed axially, helping to alleviate the hot spot that can occur between the cavity cooling in the end turns and the beginning of the duct cooling in the body of the rotor. Second, the additional electrical resistance heating due to the presence of the chimney is also distributed. Third, the stepped profile of the tilted passage can increase turbulence in the discharge chimney and improve the heat transfer coefficient. FIG. 9 illustrates a top down view of the turn and shows the stepped profile on the interior of chimney 150.

Figure 10:
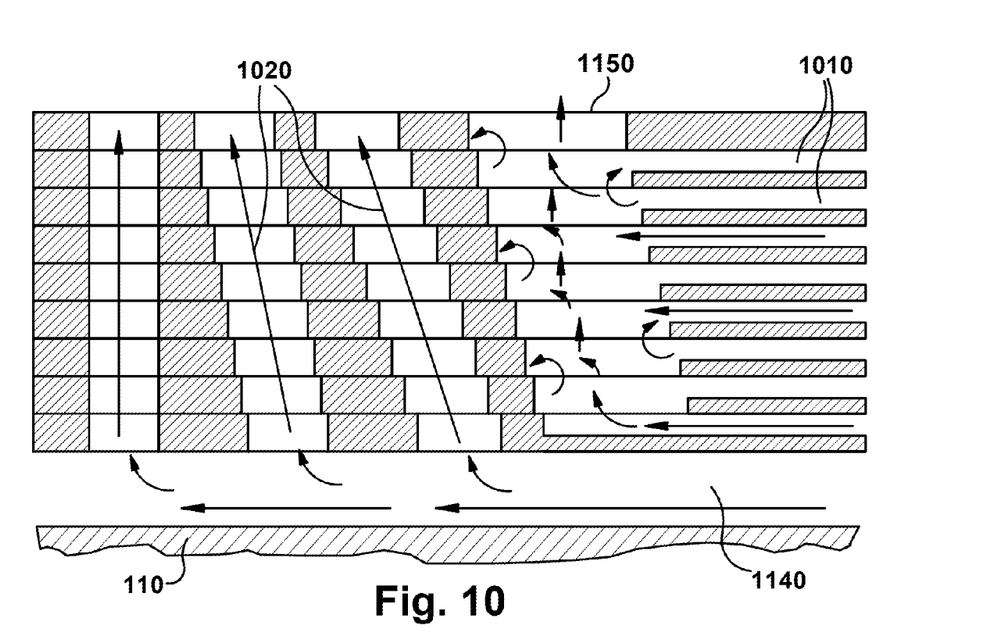
FIG. 10 illustrates a cross-sectional view of a ventilation chimney, according to another aspect of the present invention, that has a tilted flow path configuration and where the radial ducts are also configured for tilted flow paths, which are progressively more tilted the closer they are to the end winding discharge ventilation chimney.

The first few adjoining radial chimneys can also be oriented in a diagonal manner to move the effective radial duct cooling toward the field hot spot area at the end of the rotor. This is shown in FIG. 10, in which end turn cooling passages 1010 discharge into the discharge chimney 1150. Subslot 1140 discharges into radial ducts 1020. The radial ducts can be oriented at various angles of tilt with respect to the radial axis.

Figure 11:
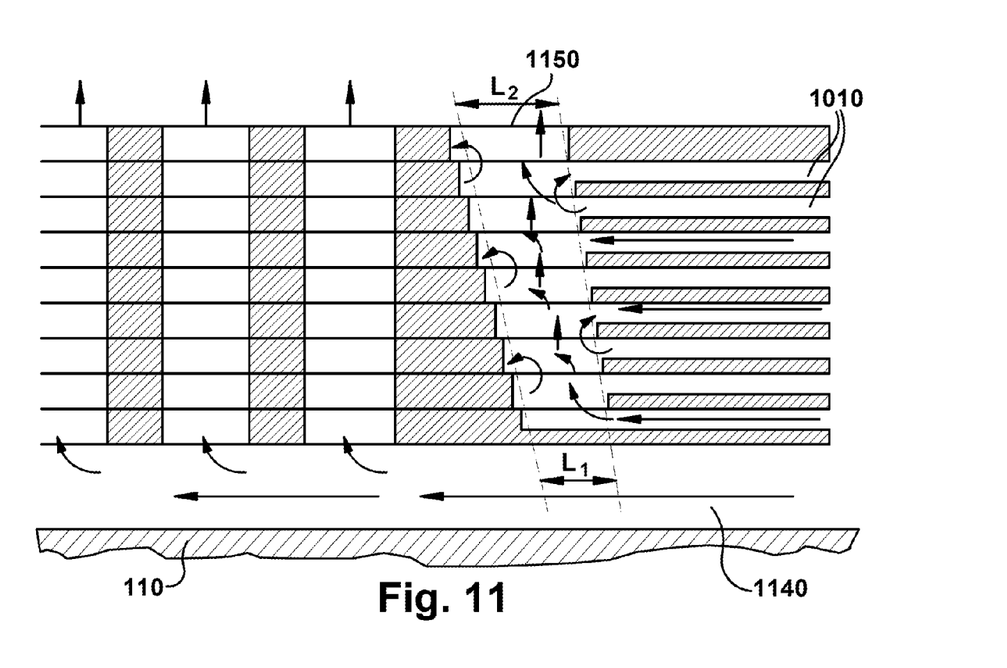
FIG. 11 illustrates another embodiment of the present invention where the ventilation chimney cross-section increases from lower radial positions to higher radial positions.

FIG. 11 illustrates another embodiment of the present invention and provides another means of augmenting heat transfer in which the chimney 1150 is made progressively wider by lengthening the slots from one turn to the next. The larger flow area in the upper turns serves to accommodate the additional flow in the chimney as it collects flow from the axial grooves 1010 in each turn. In one preferred embodiment, slot length and/or slot width increases from a narrow length $L_1$ at the bottom of the chimney 1150 to a longer length $L_2$ at the top of the chimney.

Figure 12:
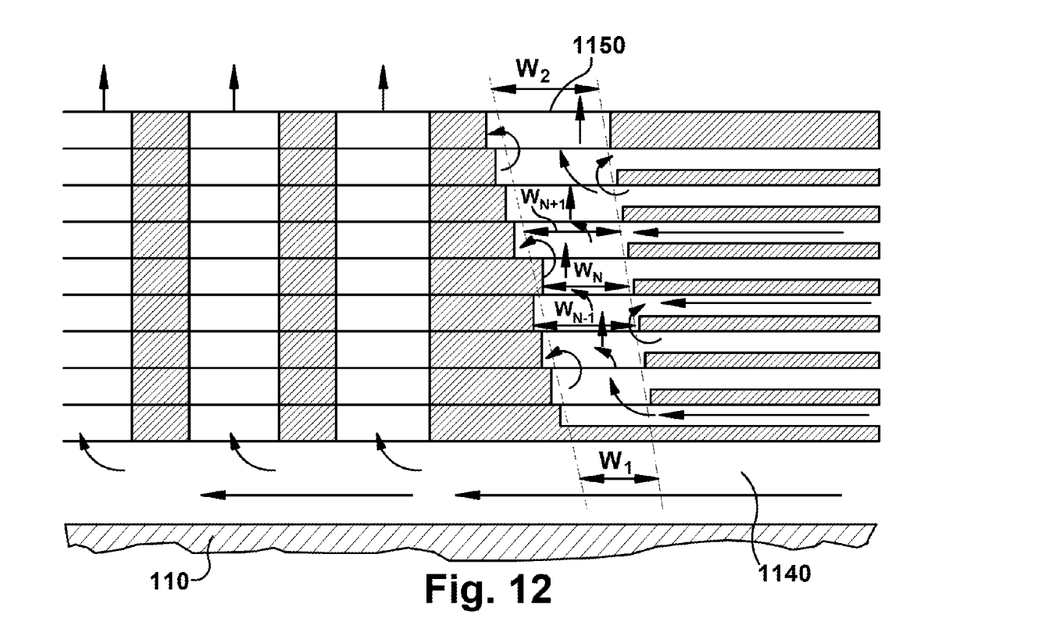
FIG. 12 illustrates another embodiment of the present invention where the ventilation chimney cross-section increases from lower radial positions to higher radial positions, and has some chimney slots with smaller cross-sectional areas to increase turbulation and heat transfer performance.

FIG. 12 shows another embodiment of the present invention, in which the progression with narrower chimney slots is interrupted with the introduction of a shorter slot part way up the coil stack as a means of increasing turbulation. For example, the length of slot N, identified as $W_N$ in the figure, may be made shorter than $W_{N+1}$ in the turn above or $W_{N-1}$ in the turn below to increase turbulence. At the same time, $W_{N+1}$ can be longer than $W_{N-1}$, and both can be shorter than $W_2$, and both can be longer than $W_1$. The introduction of a shortened slot can be repeated every few turns so as to further increase the turbulence of the flow. This can also be accomplished by varying slot width from turn to turn, or by using a combination of slot length and slot width variation along the coil the flow path.

Figure 13:
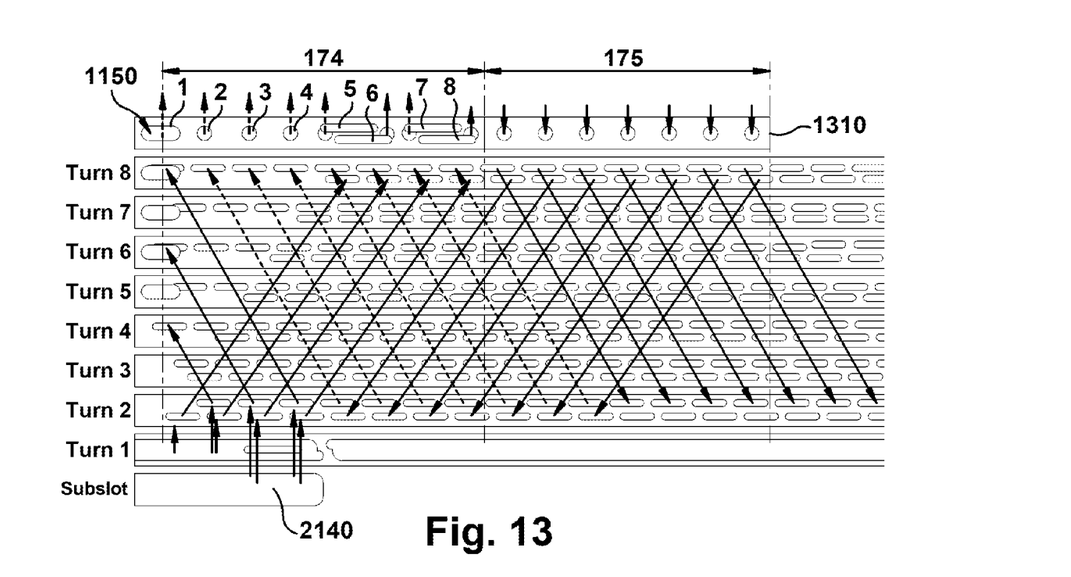
FIG. 13 illustrates an exploded view of a coil with each turn and the creepage block viewed from the top down, according to one embodiment of the present invention.

FIG. 13 illustrates another embodiment of the present invention and may be applied to a diagonal flow rotor. This is a schematic representation in which the individual turns and creepage block 1310 are individually rotated through ninety degrees so that the top surface of each faces the viewer. This has been done to show the configuration of the individual slots in each turn, but it is to be understood that this is for clarity purposes. In the operating rotor, the turns would be stacked one upon the other, and the view shown in FIG. 13 would not be visible. Cold gas is drawn in through a subslot 140 entrance and discharged through an auxiliary chimney adjacent to the slot end discharge chimney to its left (but not shown in the figure).

Figure 14:
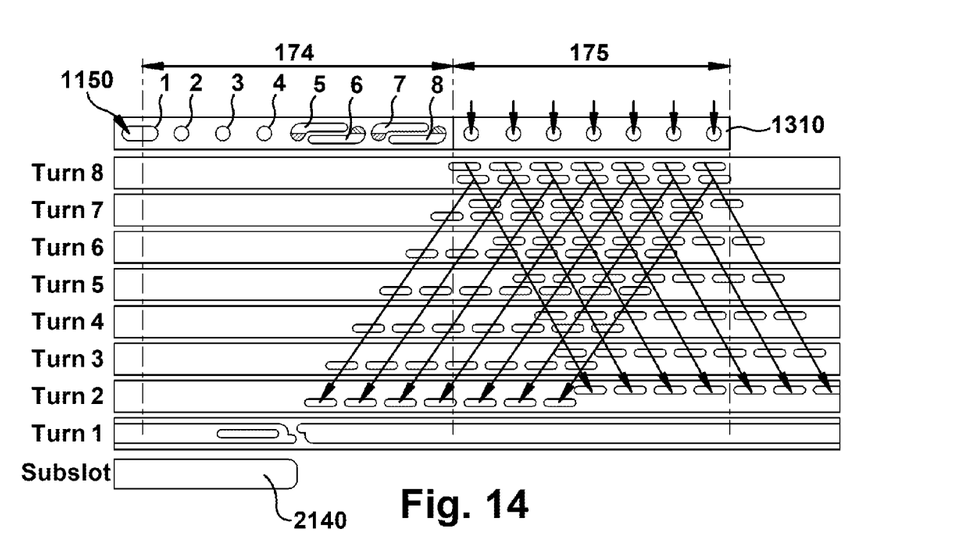
FIG. 14 illustrates a partial decomposition of FIG. 13, showing the radially inward distribution of gas entering from the air gap over the length of the first inlet section.
Figure 15:
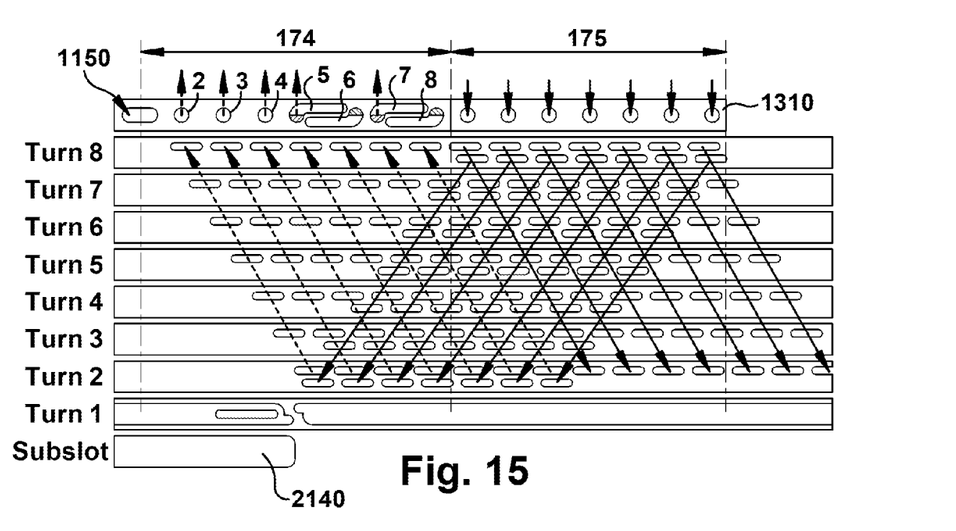
FIG. 15 illustrates a partial decomposition of FIG. 13, showing the portion of the gas discharging at transition section.
Figure 16:
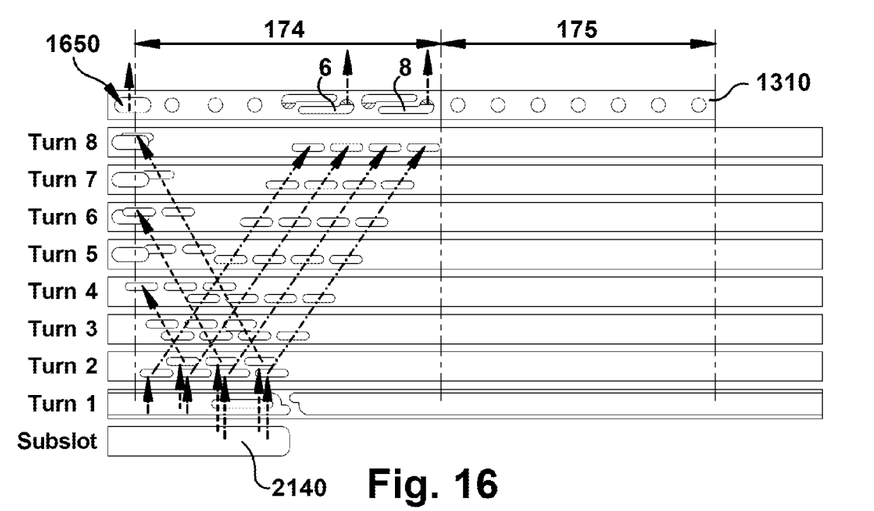
FIG. 16 illustrates partial decomposition of FIG. 13, showing flow paths of the portion of the gas entering subslot.

FIGS. 14 through 16 show decompositions of the same arrangement; to isolate the various gas flows in a way that helps clarify the exposition. FIG. 14 shows the passages fed by the first diagonal flow gap-pick-up inlet section 175, in which half of the passages direct gas radially inward and to the right and in which the other half of the passages direct gas radially inward and to the left. The gas flowing through passages directed toward the left enters a collection manifold in the bottom turn which allows the gas to communicate with passages that direct the gas back toward the rotor surface over the axial length of transition section 174. These are the passages indicated by dashed arrows in FIG. 15.

The axial region into which these passages discharge is generally referred to as the transition section 174. This embodiment of the present invention differs from the conventional approach, in that the axial grooves in the transition section 174 have been removed and replaced with the pattern of vent slots that extend the diagonal flow lattice (of crisscrossing diagonal flow passages) all the way through the transition section 174.

FIG. 16 shows the vent slots that form the passages that define the flow paths of cooling gas entering subslot 140. All of these passages shown in this figure are fed from subslot 140. In this embodiment, four passages are directed radially upward and to the right, and have been indicated by line segments consisting of an alternating pattern of dots and dashes with arrows indicating the direction of flow. Three passages are directed radially upward and to the left, and are indicated by line segments consisting of a sequence of dashes with arrows indicating the direction of flow. The dashed-arrow gas flows discharge through a radially oriented discharge chimney 1650 that extends part way down the coil stack down to and including the 5th turn, in this example.

In a diagonal flow discharge section in the main body section of the rotor, a diagonal flow passage can be directed upward from the left, and another can be directed upward from the right, and the two will discharge through a common hole in the creepage block. Since the pumping pressure behind each flow is provided by circumferential motion of gap-pick-up wedges at the surface of the rotor, the pumping pressures driving gas through these two passages are substantially the same. This cannot be said of this pumping pressure when measured against the centrifugal pumping pressure that drives gas toward the rotor surface through passages connected to the subslot. Since gas from the subslot may be driven by a gas pressure substantially different from gas driven by the gap-pick-up wedges, it is generally desirable to keep these flows separate. Mixing them through a common discharge hole in the wedge could allow one of the passages to dominate and choke the flow from the other passage. For this reason, and as embodied by aspects of the present invention, it is advantageous to introduce special cavities in the creepage block that pair up flow passages from the subslot, that also pair up discharge passages from the first gap-pick-up section, and in this way isolate all the gas arriving from the subslot from all of the gas arriving from the first gap-pick-up-section until both gas sources have been discharged into the air gap.

In the specific embodiment shown in FIGS. 14, 15 and 16, the creepage block is shown at the top of the coil. The transition section of the creepage block contains eight discharge cavities. The one furthest to the left is hole number 1. This is the discharge chimney that discharges all the gas flow represented by the dashed arrows. Holes number 2, 3 and 4 are the next three circular holes in the creepage block to the right of the discharge chimney. These are shown as circular cavities. Each discharges only the gas from a particular gas path originating in the first diagonal flow discharge section. Thus, no mixing with other passages occurs. Holes number 5 and 7 (elongated cavities) each combine the discharge from two adjacent dashed arrow passages shown in FIG. 15. Each originates as gas pumped in by a gap-pick-up wedge and thus no mixing with subslot flow occurs. Holes number 6 and 8 each combine the discharge from two adjacent dash-dot arrow passages shown in FIG. 16. All the gas flowing in these passages originates in the subslot and once again, no mixing between subslot flow and gap-pick-up flow occurs.

One additional feature of this cooling arrangement, shown in FIGS. 13-16 but not yet explicitly mentioned, is the grooving in turn 1. The groove in turn 1 on the right of the figures represents the redirection manifold which collects gas which has worked its way down to the bottom of the slot via diagonal passages fed by gap-pick-up wedges (e.g., the solid arrows in FIG. 15) and then redirects the flow into upward passages that discharge in the outlet sections of the rotor body (e.g., the dashed arrows in FIG. 13).

To provide adequate depth for the redirection manifold, turn 1 is generally thicker than the other turns. Turn 1 has another groove (which appears to the left of the redirection manifold in FIGS. 13 through 19). This added depth allows the slot end groove in turn 1 to channel additional gas to the passages identified in these figures and serves as an auxiliary subslot. The turn 1 groove should be considered optional and thus another variation on the concept.

Figure 17:
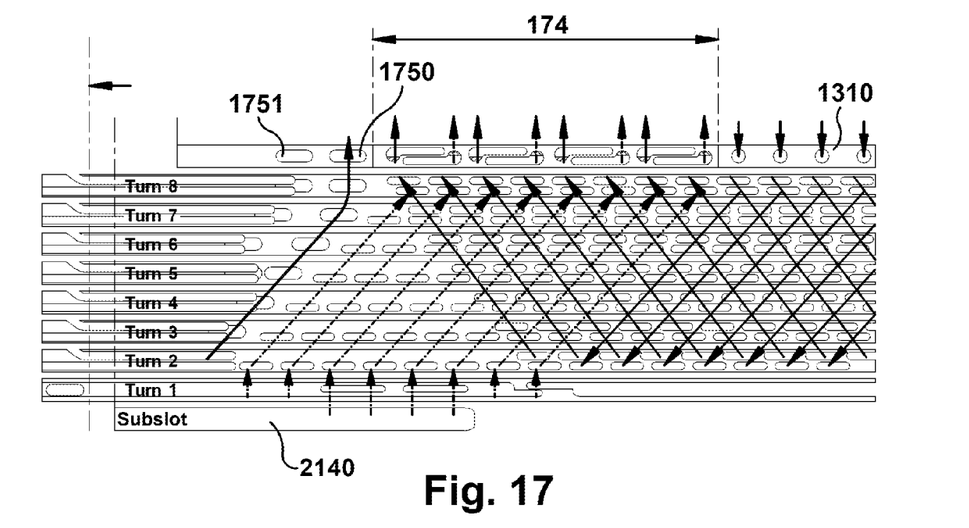
FIG. 17 illustrates an exploded view of a coil with each turn and the creepage block viewed from the top down, in a similar arrangement as FIG. 13 but with slanted slot end discharge chimneys, according to one embodiment of the present invention.

FIG. 17 illustrates another embodiment of the present invention where the axial stepping augmentation is especially suitable for diagonal flow rotors where the stepped chimney may enhance distribution of cooling in the transition section. If one assumes the convention that the drive end (DE) of the machine is on the left and the opposite-drive end (ODE) is on the right, then FIGS. 2, 3, and 7 through 12 all show the rotor in ODE orientation. FIGS. 13 through 19 show the end region in DE orientation. Thus, FIG. 17 shows the slanted slot end discharge chimney 1750 in DE orientation and thus leaning to the right, which is in contrast with FIG. 8 which shows a slanted slot end discharge chimney 150 in ODE and thus leaning to the left. The subslot and turn 1 groove feed the passages identified with a dash-dot pattern arrow formed by an extension of the diagonal flow vent slot pattern. As discussed earlier, theses passages need to be paired by means of elongated slots in the creepage block to assure that subslot flow has been isolated from the gas pumped by the gap-pick-up wedges. In the preferred embodiment the slanted slot end discharge chimney can have the same passage angle as the diagonal flow passages that provide cooling to the center region of the rotor slot.

In the embodiment shown in FIG. 17, the slot end discharge manifold makes use of two slot end discharge chimneys. The first chimney 1751 discharges slot end grooves in the upper (radially outer) turns. The second chimney 1750 discharges slot end grooves in the lower (radially inner) turns. In the preferred embodiment, both of the slanted slot end discharge chimneys have about the same passage angle as the diagonal flow passages that provide cooling to the center region of the rotor slot.

Figure 18:
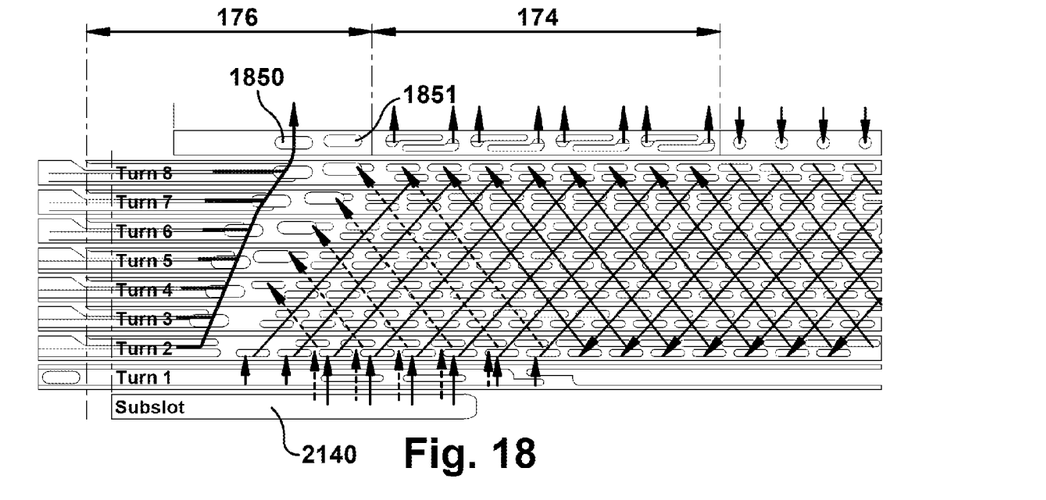
FIG. 18 illustrates an exploded view of a coil with each turn and the creepage block viewed from the top down, in a similar arrangement as FIG. 13 but with a slanted chimney which discharges a portion of the gas entering the subslot.

FIG. 18 shows another embodiment of the present invention in which slot end grooves discharge into a slanted single chimney 1850. The second chimney 1851 is used to discharge gas flowing through diagonal flow vent slots indicated by the dashed arrows.

Figure 19:
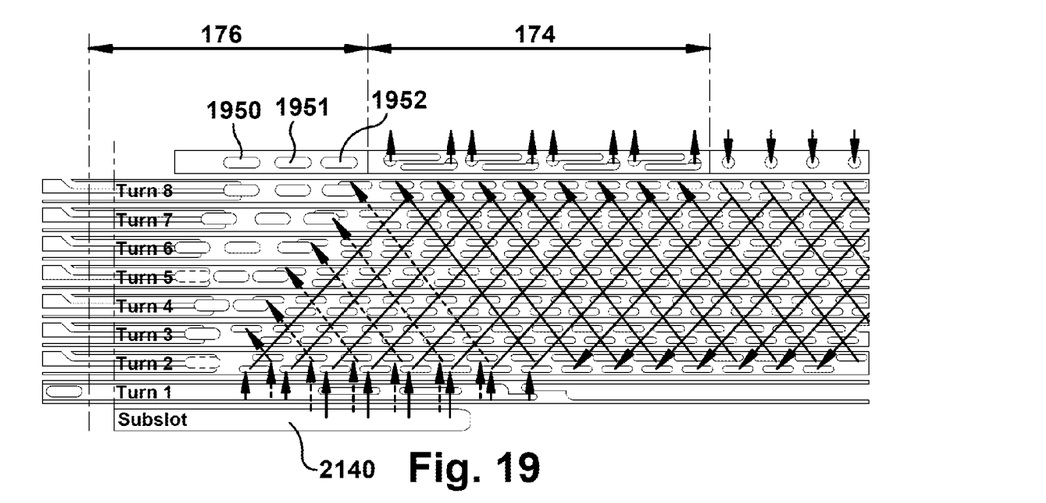
FIG. 19 illustrates an exploded view of a coil with each turn and the creepage block viewed from the top down, which combines features shown in FIG. 17 and FIG. 18.

FIG. 19 superimposes the two concepts shown in FIGS. 17 and 18. In this embodiment, slot end gas is discharged through two slanted chimneys 1950 and 1951. A third chimney 1953 is introduced to discharge gas flowing through the vent slot passages fed from the subslot and indicated by the dashed arrows in FIG. 19.

The concepts described herein can be applied to directly cooled turbine-generator rotors in air, hydrogen gas or any other suitable cooling medium. The rotor body could be cooled by either radial flow or gap pick-up cooling methods. The described invention applies to ventilation circuits that include a slot end discharge chimney used to exhaust end cooling grooves, and therefore would apply to generators that require direct end turn cooling. The cooling concepts for the transition section can apply even if direct cooling of the end turns is not used.

It should be kept in mind that all of the cooling concepts discussed herein apply to both ends of a rotor winding. Some of the figures have been drawn from the perspective of one end of the rotor, while others are drawn from the perspective of the other end. Where it serves to facilitate the discussion, figures will sometimes be identified as being in DE (Drive End) or ODE (Opposite Drive End) orientation, especially when two figures of opposite orientation are being compared. It should also be noted that for radial flow rotors, the subslot runs the full length of the rotor body, whereas for diagonal flow rotors, the subslots only penetrate a short way from each end.

Any of the previously described embodiments can be combined with each other or modified to suit the specific application. All of the above embodiments can be used with radial flow and gap pickup methods of cooling the rotor body, and can be used in single, twin or multiple chimney configurations. In some embodiments, alternating sizes or positions were shown, however, multiple sizes (e.g., more than two) and/or multiple positions (e.g., more than two) can be used to obtain increased heat transfer performance. The methods, systems and devices described herein can be used in dynamo-electric machines that are cooled with air, hydrogen gas or any other suitable cooling medium. The ventilation chimneys are typically located at the drive and opposite-drive ends of the rotor body, and the embodiments herein described could be applied to either or both of the drive and opposite-drive ends of the rotor body.

While the invention has been described in terms of various specific embodiments, those skilled in the art will recognize that the invention can be practiced with modification within the spirit and scope of the claims.

What is claimed is:

1. A rotor for a dynamoelectric machine having one or more windings, said windings comprised of one or more turns, said turns having one or more outlet ducts located near a chimney, which when stacked one on top of another form substantially radially oriented passages, wherein the heat transfer performance of a portion of said rotor can be improved by locating two or more circumferentially spaced and adjacent radial ducts near said chimney, where flow into the two or more circumferentially spaced and adjacent radial ducts is fed by a common subslot and flow through the two or more circumferentially spaced and adjacent radial ducts is in the same direction;
wherein, the flow through the two or more circumferentially spaced and adjacent radial ducts draws heat away from the chimney, and wherein the two or more circumferentially spaced and adjacent radial ducts and chimney are located in at least one of the slot end region and end winding region of the rotor.

2. A cooling gas ventilation chimney for an end region of a dynamoelectric machine having a rotor, a plurality of radial slots provided in said rotor, and a plurality of coils respectively seated in said plurality of radial slots, a plurality of radially stacked turns comprising a coil, said ventilation chimney comprising:
one or more chimney slots defined in at least a portion of said radially stacked turns, said one or more chimney slots extending in a substantially slanted direction to a radial direction of said rotor, the one or more chimney slots forming an exhaust manifold where an input to the exhaust manifold is a plurality of axially oriented cooling passages;
one or more radial ducts arranged to be slanted with respect to the radial direction of the rotor, the one or more radial ducts located near the ventilation chimney and configured to have a flow that passes in substantially the same direction as a flow passing through the ventilation chimney, the one or more radial ducts configured to draw heat away from the ventilation chimney.

3. The cooling gas ventilation chimney according to claim 2, wherein an axial length and/or width of chimney slots positioned at a radially inward location have a smaller value than an axial length and/or width of chimney slots positioned at radially outward locations.

4. The cooling gas ventilation chimney according to claim 3, wherein the axial length and/or width, of at least one radially outward chimney slot is smaller than at least one radially inward chimney slot.

5. The cooling gas ventilation chimney according to claim 2, wherein a cross-sectional area of chimney slots positioned at a radially inward location have a smaller value than a cross-sectional area of chimney slots positioned at radially outward locations.

6. The cooling gas ventilation chimney according to claim 5, wherein the cross-sectional area, of at least one radially outward chimney slot is smaller than at least one radially inward chimney slot.

7. The cooling gas ventilation chimney according to claim 2, wherein an axial length and/or width of chimney slots positioned at a radially inward location have a smaller value than an axial length and/or width of chimney slots positioned at radially outward locations.

8. The cooling gas ventilation chimney according to claim 7, wherein the axial length and or width, of at least one radially outward chimney slot is smaller than at least one radially inward chimney slot.

9. The cooling gas ventilation chimney according to claim 2, wherein a cross-sectional area of chimney slots positioned at a radially inward location have a smaller value than an cross-sectional area of chimney slots positioned at radially outward locations.

10. The cooling gas ventilation chimney according to claim 9, wherein the cross-sectional area, of at least one radially outward chimney slot is smaller than at least one radially inward chimney slot.

11. A dynamoelectric machine having a rotor, said rotor comprising a transition region located between a diagonal flow region and an end region, a plurality of radial slots provided in said rotor, and a plurality of coils respectively seated in said plurality of radial slots, a plurality of radially stacked turns comprising a coil, said transition region comprising:
one or more diagonal flow channels, said one or more diagonal flow channels discharging directly into one or more substantially radial chimneys, the radial chimneys located in the end region of the rotor and configured to exhaust directly through a creepage block.

12. The dynamo electric machine according to claim 11, wherein a first group of said one or more diagonal flow channels discharge into a first substantially radial chimney, and a second group of said one or more diagonal flow channels discharge into a second substantially radial chimney.

13. The dynamoelectric machine according to claim 11, wherein said one or more substantially radial chimneys are configured to extend in a slanted orientation, in either a linear or non-linear fashion, with respect to a radial direction.

* * * * *